US009862861B2

(12) United States Patent
Boddy et al.

(10) Patent No.: US 9,862,861 B2
(45) Date of Patent: Jan. 9, 2018

(54) WATERPROOFING COMPOSITIONS AND METHODS

(71) Applicant: Colymer Industries, LLC, Bethlehem, PA (US)

(72) Inventors: Paul L. Boddy, Doylestown, PA (US); Kenneth Brzozowski, Chardon, OH (US); Donald Leroy McDowell, Geneva, OH (US)

(73) Assignee: Colymer Industries, LLC, Bethlehem, PA (US)

( * ) Notice: Subject to any disclaimer, the term of this patent is extended or adjusted under 35 U.S.C. 154(b) by 144 days.

(21) Appl. No.: 14/938,037

(22) Filed: Nov. 11, 2015

(65) Prior Publication Data
US 2016/0130473 A1 May 12, 2016

Related U.S. Application Data

(60) Provisional application No. 62/078,193, filed on Nov. 11, 2014.

(51) Int. Cl.
*C08L 95/00* (2006.01)
*C09D 195/00* (2006.01)
*C08L 9/02* (2006.01)

(52) U.S. Cl.
CPC .......... *C09D 195/005* (2013.01); *C08L 9/02* (2013.01); *C09D 195/00* (2013.01); *C08L 2207/20* (2013.01); *C08L 2555/40* (2013.01); *C08L 2555/80* (2013.01)

(58) Field of Classification Search
None
See application file for complete search history.

(56) References Cited

U.S. PATENT DOCUMENTS

| 5,511,899 A | 4/1996 | Pavelek, II | |
| 5,969,013 A * | 10/1999 | Brzozowski | C08L 95/00 524/66 |
| 6,110,846 A * | 8/2000 | Brzozowski | C08L 95/00 442/258 |
| 6,300,394 B1 * | 10/2001 | Fensel | C08L 95/00 524/59 |
| 6,979,705 B2 * | 12/2005 | McDowell | C08K 3/346 106/277 |
| 9,273,228 B1 * | 3/2016 | Hyer | C09D 195/00 |
| 2005/0260910 A1 | 11/2005 | Brzozowski et al. | |
| 2011/0233105 A1 * | 9/2011 | Bailey | C09D 195/00 206/525 |

FOREIGN PATENT DOCUMENTS

WO    WO 2008130789 A2 * 10/2008 ............... C08K 5/19

OTHER PUBLICATIONS

Schroeder Rl, "The Use of Recycled Materials in Highway Construction", U.S. Dept. of Transportation, Federal Highway Administration, Public Roads, vol. 58, No. 2, Autumn 1994; 10 pg.
Solheim M, "Acceptable Uses for Recycled Asphalt Roofing in Washington State", Dept. of Ecology, State of Washington, Publication No. 09-07-074, Nov. 2009.
Standard Specification for "Use of Recycled Asphalt Shingle as an Additive in Hot Mix Asphalt".

* cited by examiner

*Primary Examiner* — Christopher M Rodd
(74) *Attorney, Agent, or Firm* — Morgan Lewis & Bockius LLP

(57) ABSTRACT

A waterproofing composition may include coal tar, an acrylonitrile butadiene copolymer, and ground roofing shingles. A waterproofing composition may further include a solvent or water. A water-based waterproofing composition may include a clay (e.g. a ball clay). A method of preparing a waterproofing composition may include mixing a coal tar, an acrylonitrile-butadiene copolymer, and ground roofing shingles to form a mixture; and heating the mixture to a temperature of at least about 160° C. to form a waterproofing composition.

20 Claims, 1 Drawing Sheet

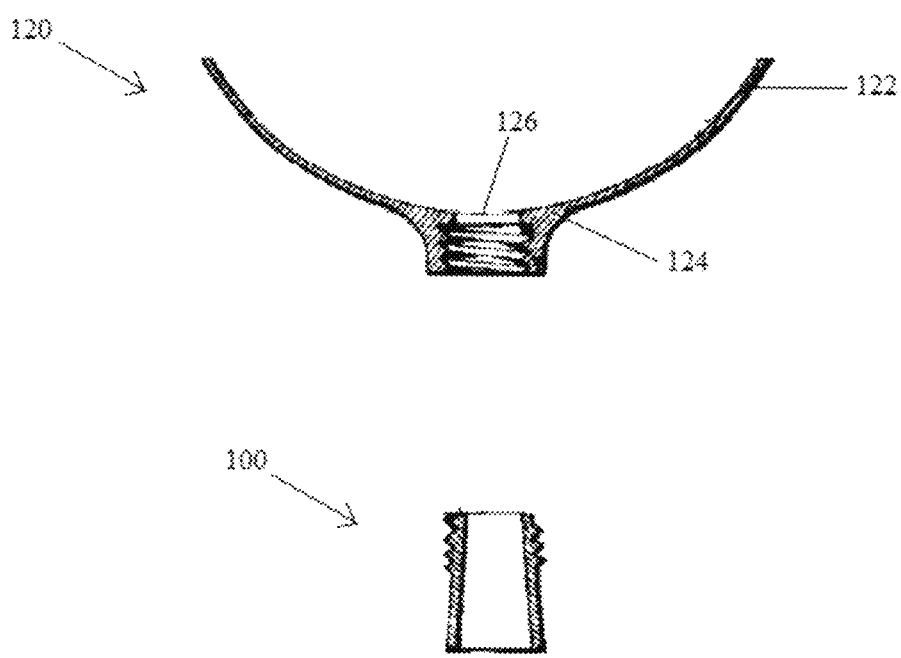

WATERPROOFING COMPOSITIONS AND METHODS

CROSS-REFERENCE TO RELATED APPLICATION

This application claims the benefit of U.S. Provisional Application Ser. No. 62/078,193, filed Nov. 11, 2014, which is incorporated by reference herein in its entirety.

BACKGROUND OF THE INVENTION

There are a great many infrastructure constituents which require efficient and effective waterproofing materials over very extensive areas of surface applications. Asphalt and coal tar (known as bitumens) products have been used to address these critical performance needs. Because of their chemical make-up, asphalt and coal tar are both effective at creating waterproof surfaces. Coal tar has been shown to be at the highest performance level of water impermeability and resistance and is considered the preferred choice in long-term effectiveness.

BRIEF SUMMARY OF THE INVENTION

In some embodiments there is a waterproofing composition comprising coal tar, an acrylonitrile butadiene copolymer, and ground roofing shingles. In one embodiment there is a waterproofing composition comprising coal tar, an acrylonitrile butadiene copolymer, ground roofing shingles and a solvent. In some embodiments a waterproofing composition further comprises a clay. In some embodiments, the solvent may include aqueous and/or non aqueous components. In one embodiment there is a waterproofing composition comprising coal tar, an acrylonitrile butadiene copolymer, ground roofing shingles, water, and a clay. In some embodiments the clay may be a ball clay.

In one embodiment there is a waterproofing composition wherein the coal tar is a ASTM D450 Type I or Type III coal tar and wherein the coal tar has a softening point of about 52° C. to about 64° C.

In some embodiments there is a waterproofing composition wherein the coal tar has a float test of from about 50 seconds to about 220 seconds as determined by ASTM Test D139.

In some embodiments there is a waterproofing composition wherein the coal tar is a RT-7, RT-8, RT-9, RT-10, RT-11, or RT-12 coal tar. In one embodiment there is a waterproofing composition wherein the coal tar is an RT-12 coal tar.

In some embodiments there is a waterproofing composition wherein the acrylonitrile butadiene copolymer comprises 1,3-butadiene. In some embodiments there is a waterproofing composition wherein the composition comprises about 3% to about 15% by weight acrylonitrile butadiene copolymer in the composition. In some embodiments there is a waterproofing composition wherein the acrylonitrile butadiene copolymer comprises about 20% to about 45% by weight acrylonitrile. In some embodiments there is a waterproofing composition wherein the acrylonitrile butadiene copolymer is a linear copolymer. In some embodiments there is a waterproofing composition wherein the acrylonitrile butadiene copolymer is a branched copolymer. In some embodiments there is a waterproofing composition wherein the acrylonitrile butadiene copolymer comprises a linear copolymer and a branched copolymer. In some embodiments there is a waterproofing composition wherein the acrylonitrile butadiene copolymer comprises about 60% up to about 100% linear copolymer. In some embodiments there is a waterproofing composition including an acrylonitrile butadiene copolymer that comprises a partitioning agent. In some embodiments there is a waterproofing composition that includes a partitioning agent that is polyvinyl chloride. In some embodiments there is a waterproofing composition that includes a partitioning agent that is calcium carbonate.

In some embodiments there is a method of preparing a waterproofing composition comprising mixing a coal tar, an acrylonitrile-butadiene copolymer, and ground roofing shingles to form a mixture; and heating the mixture to a temperature of at least about 160° C. to form a waterproofing composition. In some embodiments there is a method of preparing a waterproofing composition that includes blending a first coal tar and a second coal tar to form a coal tar.

In some embodiments there is a method of preparing a waterproofing composition comprising mixing a coal tar, an acrylonitrile-butadiene copolymer, and ground roofing shingles to form a first mixture; heating the first mixture to a temperature of at least about 160° C.; mixing water and clay to form a second mixture; heating the second mixture to a temperature of at least about 45° C.; combining the first mixture and second mixture to form a waterproofing composition, and agitating the waterproofing composition to form an emulsion. In some embodiments there is a method for preparing a waterproofing composition, wherein the waterproofing composition comprises from about 15% to about 50% by weight of coal tar, from about 10% to about 30% by weight of RAS, from about 25% to about 50% by weight of water, from about 3% to about 15% by weight of an acrylonitrile-butadiene copolymer, and from about 10% to about 20% by weight of clay. In some embodiments there is a method of preparing a waterproofing composition that includes blending a first coal tar and a second coal tar to form a coal tar.

In some embodiments there is a waterproofing composition including a coal tar that has an overall float test time of from about 50 seconds to about 220 seconds.

In some embodiments there is a method of reducing water penetration through a surface comprising applying a waterproofing composition to the surface, wherein the waterproofing composition comprises coal tar, an acrylonitrile butadiene copolymer, and ground roofing shingles. In some embodiments there is a method of reducing water penetration through a surface comprising applying a waterproofing composition to the surface, wherein the waterproofing composition includes a solvent. In some embodiments there is a method of reducing water penetration through a surface comprising applying a waterproofing composition to the surface, wherein the waterproofing composition includes clay. In some embodiments there is a method of reducing water penetration through a surface including applying a waterproofing composition to the surface, wherein the waterproofing composition includes clay and water.

BRIEF DESCRIPTION OF THE DRAWINGS

The foregoing summary, as well as the following detailed description of embodiments of the compositions and methods for waterproofing compositions, will be better understood when read in conjunction with the appended drawings of an exemplary embodiment. It should be understood, however, that the invention is not limited to the precise arrangements and instrumentalities shown.

In the drawings:

The FIGURE is a cross sectional view of a float and collar useful for testing coal tar materials in accordance with ASTM D139.

DETAILED DESCRIPTION OF THE INVENTION

Some embodiments of coal tar products of the invention include recycled asphalt shingles resulting in a product with improved properties and may serve as a basis for many types of waterproofing materials including, but not limited to, hot or molten applied versions, solvent-based coatings and mastics and, most preferably, water-borne or emulsion waterproofing coatings. Water-borne and emulsion waterproofing coatings may possess advantages including: very low odor, lower cost due to water acting as the carrier to apply the emulsified coal tar compound, conformance to all Volatile Organic Compound (VOC) regulations, elimination of fire hazard during storage and application of the product, and prevention of solvent irritation, burn hazards and spill of harmful environmental contaminants.

The uniqueness of the recycled asphalt shingle formulation creates a number of opportunities for efficient waterproofing of extensive areas, including, for example, roofs, roads and airports. The reduced odor and improved safety allow for application without the restrictions created by solvent-based and hot melt materials. Fewer problems may be created in occupied buildings, urban areas, etc. with water-based products.

Unless defined otherwise, all technical and scientific terms used herein have the same meaning as commonly understood by one of ordinary skill in the art to which this invention belongs. Although any methods and materials similar or equivalent to those described herein can be used in practice or testing of the present invention, the preferred methods and materials are described.

The articles "a" and "an" are used herein to refer to one or more than one (i.e., to at least one) of the grammatical object of the article. By way of example, "an element" means one element or more than one element.

"About" as used herein when referring to a measurable value such as an amount, a temporal duration, and the like, is meant to encompass variations of 10% from the specified value, as such variation is appropriate.

Waterproofing Compositions

A waterproofing composition may comprise coal tar, an acrylonitrile butadiene copolymer, and ground roofing shingles (RAS). In some embodiments a waterproofing composition may further comprise a solvent or water to facilitate application of the waterproofing composition. A waterproofing composition may comprise coal tar, acrylonitrile butadiene copolymer, and ground roofing shingles (RAS) dispersed in a solvent to allow for ease of application. In still other embodiments a waterproofing composition (e.g., a water-based waterproofing composition) may further comprise a clay material. A clay material may be used to create stability in the final product when water is used as a carrier in a waterproofing composition.

In some embodiments a waterproofing composition comprises, based on the total weight of the composition, from about 15% to about 50% by weight of coal tar; from about 10% to about 30% of RAS; from about 25% to about 50% by weight of solvent or water; from about 3% to about 15% by weight of a acrylonitrile-butadiene copolymer powder; and from about 10% to about 20% by weight of clay. In some embodiments such a waterproofing composition may be a water-based waterproofing composition.

In some embodiments a waterproofing composition consists essentially of coal tar, an acrylonitrile butadiene copolymer, and ground roofing shingles (RAS). In some embodiments the coal tar consists essentially of an RT-1, RT-2, RT-3, RT-4, RT-5, RT-6, RT-7, RT-8, RT-9, RT-10, RT-11, or RT-12 coal tar and a Type I or Type III coal tar. In some embodiments a waterproofing composition consists essentially of coal tar, an acrylonitrile butadiene copolymer, ground roofing shingles (RAS), and solvent. In some embodiments a waterproofing composition consists essentially of coal tar, an acrylonitrile butadiene copolymer, ground roofing shingles (RAS), and clay. In some embodiments a waterproofing composition consists essentially of coal tar, an acrylonitrile butadiene copolymer, ground roofing shingles (RAS), water, and clay. In some embodiments the clay is a ball clay. In some embodiments a waterproofing composition consists essentially of coal tar, an acrylonitrile butadiene copolymer, ground roofing shingles, solvent, and a bodying agent.

In some embodiments, a waterproofing composition comprises, based on the total weight of the composition, any of the formulations listed in Table 1A.

TABLE 1A

|   | Coal Tar | RAS | Acrylonitrile Butadiene Copolymer | Water | Clay |
|---|---|---|---|---|---|
| Formulation 1 | about 15% to about 50% | about 10% to about 30% | about 2% to about 15% | about 25% to about 50% | about 3% to about 15% |
| Formulation 2 | about 20% to about 40% | about 15% to about 25% | about 5% to about 10% | about 30% to about 40% | about 5% to about 10% |
| Formulation 3 | about 15% to about 30% | about 20% to about 30% | about 2% to about 15% | about 25% to about 50% | about 3% to about 15% |
| Formulation 4 | about 30% to about 50% | about 5% to about 25% | about 2% to about 15% | about 25% to about 50% | about 3% to about 15% |
| Formulation 5 | about 10% to about 30% | about 15% to about 40% | about 2% to about 7% | about 25% to about 50% | about 3% to about 15% |
| Formulation 6 | about 10% to about 30% | about 10% to about 30% | about 7% to about 15% | about 25% to about 50% | about 3% to about 15% |
| Formulation 7 | about 10% to about 30% | about 5% to about 25% | about 2% to about 15% | about 25% to about 50% | about 3% to about 15% |
| Formulation 8 | about 10% to about 30% | about 5% to about 25% | about 2% to about 15% | about 20% to about 70% | about 3% to about 15% |

In some embodiments, a waterproofing composition comprises, based on the total weight of the composition, any of the formulations listed in Table 1B.

TABLE 1B

|  | Coal Tar | RAS | Acrylonitrile Butadiene Copolymer | Solvent | Clay |
|---|---|---|---|---|---|
| Formulation 9 | about 20% to about 60% | about 15% to about 40% | about 10% to about 25% | about 0% to about 5% | — |
| Formulation 10 | about 30% to about 80% | about 15% to about 40% | about 5% to about 20% | about 0% to about 5% | — |
| Formulation 11 | about 30% to about 80% | about 5% to about 25% | about 2% to about 25% | about 0% to about 5% | — |
| Formulation 12 | about 30% to about 90% | about 5% to about 25% | about 2% to about 15% | about 0% to about 5% | — |
| Formulation 13 | about 15% to about 50% | about 10% to about 30% | about 2% to about 15% | about 25% to about 50% | — |
| Formulation 14 | about 20% to about 40% | about 15% to about 25% | about 5% to about 10% | about 30% to about 40% | — |
| Formulation 15 | about 15% to about 30% | about 20% to about 30% | about 2% to about 15% | about 25% to about 50% | — |
| Formulation 16 | about 60% to about 80% |  | about 2% to about 10% | about 14% to about 26% |  |

Each of the coal tars described herein is combinable with one or more of the recycled materials and/or one or more of the copolymers described herein and each such combination forms a distinct embodiment of waterproofing composition. Similarly, each of the recycled materials described herein is combinable with one or more of the coal tars and/or one or more of the copolymers described herein, and each such combination forms a distinct embodiment. Each of the copolymers described herein is combinable with one or more coal tars and/or one or more of the recycled materials described herein and each such combination forms a distinct embodiment.

Coal Tar

In some embodiments, useful coal tars may be identified with a "float test" time measurement to indicate the relative flow or viscosity characteristics of materials. "Float test time" can be determined by ASTM Test D139 entitled "Test Method for Float Test for Bituminous Materials," which is hereby incorporated by reference in its entirety. ASTM Test D139 is commonly used for testing the viscosity or consistency of semi-solid bituminous material. FIG. 1 shows a typical float test apparatus. Generally, a plug of bitumen is cast in a tapered collar 100. The collar 100 may have a mass between 9.60 and 10.00 g (preferably 9.80 g), an over-all height of 22.3 mm to 22.7 mm (preferably 22.5 mm), an inside diameter at the bottom of 12.72 mm to 12.92 mm (preferably 12.82 mm), and an inside diameter at the top of 9.65 mm to 9.75 mm (preferably 9.70 mm). A float 120 may be made of aluminum or aluminum alloy and may have a mass between 37.70 g and 38.10 g (preferably 37.90 g), a total height between 34.0 mm and 36.0 mm (preferably 35.0 mm), with the height of the rim 122 above the lower side of the shoulder 124 may be between 26.5 mm and 27.5 mm (preferably 27.0 mm), the thickness of the shoulder 124 may be between (1.3 mm and 1.5 mm (preferably 1.4 mm), and the diameter of the opening 126 may be between 11.0 mm and 11.2 mm (preferably 11.1 mm). The assembled float and collar are then floated in a testing bath that is either a circular bath of at least 185 mm in internal diameter containing water at least 185 mm in depth or a rectangular bath with minimum internal dimensions of 150 mm width and 300 mm length, and containing water at least 11 mm in depth. In either case the height of the surface of the container above the water is at least 40 mm. The water bath is maintained at 5.0±1° C. for 15 to 30 min. The water in the testing bath is heated to 32° C. (89.8° F.) or 50° C. (122° F.) depending on the range of tar being tested. The time, in seconds, between placing the apparatus on the water and the water breaking through the material shall be taken as a measure of the consistency of the material under examination. As the material becomes warm and fluid, it is forced upward and out of the collar until the water gains entrance into the saucer and causes it to sink.

In some embodiments, a suitable coal tar may have a float test time at 50° C. (122° F.) of from about 25 seconds to about 250 seconds, about 50 seconds to about 220 seconds, about 75 seconds to about 200 seconds, about 100 seconds to about 175 seconds, or about 150 seconds, as determined by ASTM Test D139 and as described above. In some embodiments, a suitable coal tar may have a float test time at 50° C. (122° F.) of from about 25 seconds to about 50 seconds, about 50 seconds to about 75 seconds, about 75 seconds to about 100 seconds, about 100 seconds to about 125 seconds, about 125 seconds to about 150 seconds, about 150 seconds to about 175 seconds, about 175 seconds to about 200 seconds, about 200 seconds to about 220 seconds, or about 220 seconds to about 250 seconds, as determined by ASTM Test D139. In some embodiments, a suitable coal tar may have a float test at 50° C. (122° F.) of about 25 seconds, about 40 seconds, about 50 seconds, about 60 seconds, about 70 seconds, about 80 seconds, about 90 seconds, about 100 seconds, about 110 seconds, about 120 seconds, about 130 seconds, about 140 seconds, about 150 seconds, about 160 seconds, about 170 seconds, about 180 seconds, about 190 seconds, about 200 seconds, about 210 seconds, about 220 seconds, about 230 seconds, about 240 seconds or about 250 seconds, as determined by ASTM Test D139.

In some embodiments, a suitable coal tar may be commercially available and may be designated with an "RT" prefix, for example RT-5, RT-6, RT-7, RT-8, RT-9, RT-10, RT-11, or RT-12 coal tars.

In some embodiments, a coal tar with a higher viscosity range such as RT-11 and RT-12 coal tar are used. RT-11 generally has a float test of about 100 seconds to about 150 seconds at 50° C., and RT-12 generally has a float test of about 150 seconds to about 220 seconds at 50° C. The RT-11 and RT-12 coal tars have a minimum specific gravity of 1.16 at 23/25° C. Generally, an RT-12 coal tar is the preferred material for producing the low cost rubberized coal tar product.

The coal tars used to prepare the emulsions of the invention also include those coal tars conventionally designated as RT-5 and RT-6 which are characterized as having an Engler 50 mL viscosity at 50° C. (122° F.) of from about 17 to 26 and about 26 to 40, respectively. Engler viscosity may be determined in accordance with ASTM D1665, "Standard Test Method for Engler Specific Viscosity of Tar Products," which is hereby incorporated by reference in its entirety. The standard specification for road tars, including RT-1, RT-2, RT-3, RT-4, RT-5, RT-6, RT-7, RT-8, RT-9, RT-10, RT-11, and RT-12, may be found in ASTM D490-92, "Standard Specification for Road Tars," which is hereby incorporated by reference in its entirety and which specifies particular parameters for testing including those required for Engler Specific Viscosity.

In some embodiments the coal tar may have a softening point of about 40° C. to about 80° C., about 45° C. to about 75° C., about 50° C. to about 70° C., about 52° C. to about 64° C., or about 55° C. to about 60° C. as measured in accordance with ASTM D36, "Standard Test Method for Softening Point of Bitumen (Ring-and-Ball Apparatus)," which is hereby incorporated by reference in its entirety. In some embodiments the coal tar may have a softening point of about 40° C. to about 45° C., about 45° C. to about 50° C., about 50° C. to about 55° C., about 55° C. to about 60° C., about 60° C. to about 65° C., about 65° C. to about 70° C., about 70° C. to about 75° C., or about 75° C. to about 80° C. as measured in accordance with the parameters and procedure outlined in ASTM D36. In some embodiments the coal tar may have a softening point of about 40° C., about 45° C., about 50° C., about 52° C., about 55° C., about 57° C., about 60° C., about 65° C., about 70° C., about 75° C., or about 80° C. as measured in accordance with the parameters and procedure outlined in ASTM D36.

In some embodiments the coal tar may be a roofing-type coal tar and may be identified as a Type I or Type III material according to ASTM D450, "Standard Specification for Coal-Tar Pitch Used in Roofing, Dampproofing, and Waterproofing," which is hereby incorporated by reference in its entirety. Type I materials generally have a softening point of about 52° C. to about 60° C., as measured in accordance with ASTM D36. Type III materials generally have a softening point of about 56° C. to about 64° C., as measured in accordance with ASTM D36.

In some embodiments, the coal tar may comprise a first coal tar and a second coal tar with different characteristics from the first coal tar. In embodiments comprising a first coal tar and a second coal tar, the first coal tar and second coal tar may be independently chosen from any of the coal tars described herein. Preferably, the first coal tar has a float test of from about 25 seconds to about 250 seconds and the second coal tar has a softening point of about 40° C. to about 80° C. Preferably, the first coal tar is an RT-11 or RT-12 coal tar, and the second coal tar is a Type I or Type III coal tar. In some embodiments the ratio by weight of first coal tar to second coal tar may be about 50:50, about 55:45, about 60:40, about 65:35, about 70:30, about 75:25, about 80:20, about 85:15, about 90:10, or about 95:5. In some embodiments the second coal tar may comprise up to about 50, about 45, about 40, about 35, about 30, about 25, about 20, about 15, about 10, or about 5 parts by weight of the coal tar. In some embodiments, the coal tar may comprise about 40% to about 60% by weight first coal tar and about 60% to about 40% by weight second coal tar. In other embodiments, the coal tar may comprise about 20% to about 40% by weight first coal tar and about 80% to about 60% by weight second coal tar, about 80% to about 60% by weight first coal tar and about 20% to about 40% by weight second coal tar, about 10% to about 30% by weight first coal tar and about 90% to about 70% by weight second coal tar, or about 90% to about 70% by weight first coal tar and about 10% to about 30% by weight second coal tar.

Recycled Materials

Some embodiments of the invention include recycled or reusable materials. Recycled ingredients which may be useful in the invention to effect, among other things, a cost reduction include, but are not limited to, Combustion Fly Ash, Roofing Shingle Waste (RAS), Scrap Tires, Reclaimed Asphalt Pavement, Coal Bottom Ash, Ground Built-Up Roofing Scrap.

Roofing shingle waste may include recycled asphalt shingles ("RAS"); as used herein the term RAS refers to any type of roofing shingle waste, including recycled asphalt shingles. The use of roofing shingle waste (RAS) may show a positive effect on the overall efficiency and/or performance of waterproofing compositions. In some embodiments, the inclusion of RAS may yield waterproofing compositions with greater consistency, uniformity, toughness and stability at all temperatures. It has been determined that waterproofing compositions of the invention will tolerate significant amounts of RAS (e.g., ground roofing shingles) without deleterious effects on properties. In some embodiments, appropriate selected amounts of RAS improve performance of waterproofing compositions.

RAS may comprise ground asphalt roofing shingles. In one embodiment, RAS may consist of ground asphalt roofing shingles. In one embodiment, RAS may consist essentially of ground asphalt roofing shingles. Asphalt roofing shingles may comprise a felt mat saturated with asphalt and small rock granules. In some embodiments RAS comprises about 19% to about 36%, about 20% to about 30%, about 23% to about 27%, about 19% to about 22%, about 19% to about 26%, about 23% to about 25%, about 25% to about 28%, about 28% to about 30%, about 30% to about 33%, about 33% to about 36%, or about 30% to about 36% by weight asphalt cement. In some embodiments, RAS may further comprise a mineral filler or stabilizer, such as limestone, silica, dolomite, kaolin, talc, mica, graphite, carbon black, and calcium carbonate, among others. In some embodiments, RAS comprises about 8% to about 60%, about 12% to about 55%, about 15% to about 50%, about 20% to about 45%, about 20% to about 35%, about 25% to about 30%, about 8% to about 15%, about 15% to about 25%, about 25% to about 35%, about 35% to about 40%, about 40% to about 45%, about 45% to about 50%, about 50% to about 55%, or about 55% to about 60% by weight mineral filler or stabilizer. RAS may further comprise mineral granules, such as ceramic-coated natural rock, aluminum oxide, titanium dioxide, or a clay, such as kaolin clay. In some embodiments, RAS comprises mineral granules in an amount of about 0% to about 45%, about 0% to about 5%, about 2% to about 10%, about 5% to about 15%, about 2% to about 20%, about 18% to about 40%, about 20% to about 38%, about 23% to about 35%, about 25% to about 33%, about 27% to about 30%, about 20% to about 25%, about 25% to about 30%, or about 30% to about 38% by weight. RAS may further comprise felt backing or mat. Such felt backing may be organic, and comprise, for example paper or cellulose, or may comprise fiberglass. In some embodiments, RAS comprises felt backing materials in an of about 1% to about 15%, about 5% to about 12%, about 7% to about 10%, about 1% to about 3%, about 3% to about 5%, about 5% to about 7%, about 7% to about 10%, about 10% to about 12%, or about 12% to about 15% by weight. RAS may further comprise water in an amount of about 0% to about 10%, about 0% to about 8%, about 0% to about 5%, about 1% to about 5%, or about 1% to about 3% by weight water. In some embodiments RAS may comprise less than about 6%, less than about 5%, less than about 4%, less than about 3%, less than about 2%, or less than about 1% by weight water. In some embodiments RAS may comprise about 0% to about 45%, about 0% to about 5%, about 2% to about 10%, about 5% to about 15%, about 2% to about 20%, about 18% to about 40%, about 20% to about 38%, about 23% to about 35%, about 25% to about 33%, about 27% to about 30%, about 20% to about 25%, about 25% to about 30%, or about 30% to about 38% by weight other non-hazardous ingredients.

In some embodiments RAS comprises Harmonite, available from RSS, LC. In some embodiments RAS comprises the ingredients listed in Table 2.

TABLE 2

| Ingredient | Wt % of total RAS |
|---|---|
| Limestone | 25%-45% |
| Oxidized Asphalt | 20%-30% |
| Crystalline Silica | 1%-10% |
| Aluminum Oxide | <7% |
| Glass fiber - wool (fiberglass) | 1%-3% |
| Titanium dioxide | 0%-4% |
| Kaolin Clay | 0%-2% |
| Non-Hazardous ingredients | 20%-26% |
| Water | <2% |

In some embodiments RAS has physical properties listed in Table 3.

TABLE 3

| Specific gravity | 1.93 |
|---|---|
| Bulk density | 39 lbs/ft$^3$ |
| Flash point | Approx. 220° C. |
| Softening point | Approx. 240° C. |
| Volume Resistivity | 1.1 × 10$^{10}$ ohm-m |
| Hazard class of dust deflagration | St-1 |
| Deflagration Index, K$_{st}$ | 101 bar-m/sec |
| Max Pressure Rise Rate, dP/dt | 370 bar/sec |
| Max Pressure Output, P$_{max}$ | 6.9 bar |

In some embodiments RAS has a specific gravity of about 1 to about 4, about 1 to about 3, about 1.5 to about 2.5, about 1.75 to about 2.25, or about 2. In some embodiments, RAS has a bulk density of about 30 lbs/ft$^3$ to about 50 lbs/ft$^3$, about 35 lbs/ft$^3$ to about 45 lbs/ft$^3$, about 37 lbs/ft$^3$ to about 42 lbs/ft$^3$, or about 40 lbs/ft$^3$. In some embodiments, RAS has a flash point of about 180° C. to about 260° C., about 190° C. to about 250° C., about 200° C. to about 240° C., about 210° C. to about 230° C., about 215° C., about 220° C., or about 225° C. In some embodiments, RAS has a softening point of about 200° C. to about 280° C., about 210° C. to about 270° C., about 220° C. to about 260° C., about 230° C. to about 250° C., about 235° C., about 240° C., or about 245° C. IN some embodiments, RAS has a volume resistivity of about 9×10$^9$ ohm-m to about 1.3×10$^{10}$ ohm-m, or about 1.0×10$^{10}$ ohm-m, about 1.1×10$^{10}$ ohm-m, or about 1.2×10$^{10}$ ohm-m. IN some embodiments, RAS has a deflagration index, K$_{st}$, of about 70 bar-m/sec to about 130 101 bar-m/sec, about 80 bar-m/sec to about 120 bar-m/sec, about 90 bar-m/sec to about 110 bar-m/sec, about 90 bar-m/sec, about 95 bar-m/sec, about 96 bar-m/sec, about 97 bar-m/sec, about 98 bar-m/sec, about 99 bar-m/sec, about 100 bar-m/sec, about 101 bar-m/sec, about 102 bar-m/sec, about 103 bar-m/sec, about 104 bar-m/sec, or about 105 bar-m/sec. In some embodiments, RAS has a maximum pressure rise rate (dP/dt) of about 300 to about 500 bar/sec, about 325 to about 475 bar/sec, about 350 bar/sec to about 450 bar/sec, about 350 to about 400 bar/sec, about 360 bar/sec, about 365 bar/sec, about 370 bar/sec, about 375 bar/sec, or about 380 bar/sec. dP/dt can be measured in accordance with ASTM E1226, which is hereby incorporated by reference in its entirety. In some embodiments, RAS has a maximum pressure output (P$_{max}$) of about 5 to about 9 bar, about 6 to about 8 bar, about 6.5 to about 7.5 bar, about 6.6 bar, about 6.7 bar, about 6.8 bar, about 6.9 bar, about 7 bar, about 7.1 bar, about 7.2 bar, about 7.3 bar, about 7.4 bar, or about 7.5 bar. Pmax can be measured in accordance with ASTM E1226, which is hereby incorporated by reference in its entirety.

In some embodiments, RAS is ground to the specifications listed in Table 4.

TABLE 4

| Sieve Analysis | |
|---|---|
| U.S. Sieve | % Retained |
| 14 | 0 |
| 20 | 0 |
| 25 | 0 |
| 30 | 0 |
| 35 | 0 |
| 40 | 1 |
| 45 | 5 |
| 50 | 8 |
| 60 | 6 |
| 70 | 15 |
| 100 | 64 |
| 170 | 0 |
| Pan | 0 |
| Total | 99 |

In some embodiments, the RAS is ground such that about 30%, about 40%, about 50%, about 60%, about 70%, or about 80% will pass through a U.S. Standard Mesh Sieve Size 100. In some embodiments, the RAS is ground such that about 50% to about 80%, about 55% to about 75%, or about 60% to about 70% will pass through a U.S. Standard Mesh Sieve Size 100. In some embodiments, the RAS is ground such that about 0%, about 2%, about 3%, about 4%, about 5%, about 6%, about 7%, about 8%, about 9%, or about 10% will pass through a U.S. Standard Mesh Sieve Size 45. In some embodiments, the RAS is ground such that about 0% to about 10%, about 2% to about 8%, about 3% to about 7%, or about 4% to about 6% will pass through a U.S. Standard Mesh Sieve Size 45. In some embodiments, the RAS is ground such that up to about 2%, up to about 3%, up to about 4%, up to about 5%, up to about 6%, up to about 7%, or up to about 8% will pass through a U.S. Standard Mesh Sieve Size 45.

In some embodiments a waterproofing composition comprises up to about 50%, up to about 45%, up to about 40%, up to about 35%, up to about 30%, up to about 25%, up to about 20%, up to about 17%, up to about 15%, up to about 12%, up to about 10%, up to about 7%, or up to about 5% by weight RAS. Preferably, a waterproofing composition comprises up to about 20% by weight RAS. Improvement is noted in the firmness or toughness of the final product without detracting from its advantages or benefits.

A waterproofing compound consisting essentially of 88% by weight RT coal tar, 5% by weight Type I roofing tar, (0% by weight RAS), and 7% by weight acrylonitrile butadiene polymer has the physical characteristics listed in Table 5. Modifying the amount of RAS (5%, 10%, 15%, and 20%) resulted in physical characteristics listed in Table 5.

Table 5 indicates the properties obtained with a specific formula at different levels of RAS:

TABLE 5

| RAS Wt. % | 0 | 5 | 10 | 15 | 20 |
|---|---|---|---|---|---|
| Softening Point (° F.) | 125 | 132 | 134 | 138 | 145 |
| Elongation (%) at 70° F | 2300 | 1200 | 1100 | 1050 | 1025 |
| Slope Resistance to flow at 70° F | ½" | ½" | ⅝" | ¾" | 1" |
| Toughness at at 70° F | 0.7 | 0.7 | 0.9 | 1.1 | 1.2 |

Toughness (also referred to as strain energy) is a measure of the energy absorption characteristics of a material under load up to the point of fracture. It is equal to the area under the stress-strain diagram and is a measure of the ability of a roof to deform without fracturing. The tougher a roof is, the more resistance it has to breakage and consequently leakage.

A number of recycled or reused products other than RAS can be employed in waterproofing compositions of the invention. Typically, these materials are added in more limited amounts then the RAS and may act as fillers or extenders.

Table 6 indicates the additions of recycled materials which can be added in some embodiments without negatively affecting the overall properties of a finished waterproofing composition. These percentages yield a rubberized compound which conforms to all the ratios and information outlined in this disclosure.

TABLE 6

| Recycled Material | Tolerance Weight Percentage Range in Waterproofing Compositions |
|---|---|
| Combustion Fly Ash | 2-10% |
| Scrap Tires | 2-10% |
| Reclaimed Asphalt Pavement | 5-20% |
| Coal Bottom Ash | 2-10% |
| Recycled Built-Up Roofing | 5-20% |

Acrylonitrile Butadiene Copolymer

In some embodiments, waterproofing compositions of the invention comprise an acrylonitrile butadiene copolymer. Such polymer may provide significant compatibility and property improvement of the coal tar ingredients. Acrylonitrile butadiene copolymers useful in waterproofing compositions of the invention include, but are not limited to, polymers that are commercially available from Goodyear and are listed in Table 7.

TABLE 7

| Chemigum Designation | Bound Acrylonitrile (%) | Mooney Viscosity ML-4 @100° C. |
|---|---|---|
| N386B | 40.5 | 55-65 |
| N683B | 33.4 | 25-35 |
| N685B | 33.4 | 45-55 |
| N687B | 33.4 | 65-75 |
| N689B | 33.4 | 79-91 |

TABLE 7-continued

| Chemigum Designation | Bound Acrylonitrile (%) | Mooney Viscosity ML-4 @100° C. |
|---|---|---|
| N785B | 27.7 | 45-55 |
| N984B | 20.0 | 35-45 |
| N300 | 40.0 | 50-63 |
| N608 | 33.4 | 63-75 |
| N612B | 33.4 | 20-30 |
| N615B | 33.4 | 47-60 |
| N628B | 33.4 | 68-85 |

In some embodiments, the acrylonitrile component of the copolymer may be 2-propenenitrile. In some embodiments, the butadiene component of the copolymer may be 1,2-butadiene. In other embodiments, the butadiene component of the copolymer may be 1,3-butadiene. In some embodiments, minor amounts of monomers other than acrylonitrile and butadiene may be present, but the copolymers of acrylonitrile and butadiene are preferred. For example, in some embodiments, the acrylonitrile butadiene copolymer may comprise about 0% to about 2%, about 2% to about 5%, about 4% to about 7%, about 5% to about 8%, or about 6% to about 10% by weight monomer other than acrylonitrile or butadiene, based on the weight of the copolymer. In some embodiments, the acrylonitrile butadiene copolymer may comprise about 2%, about 3%, about 4%, about 5%, about 6%, about 7%, about 8%, about 9%, or about 10% by weight monomer other than acrylonitrile or butadiene, based on the weight of the copolymer. In some embodiments, the acrylonitrile butadiene copolymer may comprise up to about 2%, up to about 3%, up to about 4%, up to about 5%, up to about 6%, up to about 7%, up to about 8%, up to about 9%, or up to about 10% by weight monomer other than acrylonitrile or butadiene, based on the weight of the copolymer.

Generally, the copolymer may be comprised of a major amount of butadiene (e.g., greater than about 50%, about 55%, about 60%, about 65%, about 70%, about 75%, about 80%, about 85%, about 90%, or about 95% by weight based on the weight of the copolymer) and a minor amount of the acrylonitrile (e.g., less than about 50%, about 45%, about 40%, about 35%, about 30%, about 25%, about 20%, about 15%, about 15%, about 10%, or about 5%). As the acrylonitrile content increases, it may be increasingly more difficult to dissolve the copolymer in the tar. In some embodiments the acrylonitrile butadiene copolymer comprises about 10% to about 60%, about 15% to about 50%, about 20% to about 45%, about 25% to about 35%, about 20% to about 30%, or about 30% to about 40% by weight acrylonitrile based on the weight of the copolymer. Blends of two or more acrylonitrile copolymers also may be utilized to provide waterproofing compositions having the desired properties.

Acrylonitrile-butadiene copolymers may be linear copolymers or crosslinked copolymers. Blends of a mixture of a linear copolymer and a crosslinked copolymer also may be utilized to provide waterproofing compositions having the desired properties. In some embodiments where a mixture of copolymers is utilized, the copolymer mixture may comprise a major amount of the linear copolymer and a minor amount of a crosslinked copolymer. Thus, in one embodiment, the copolymer mixture will contain from about 60% to about 100% by weight of a linear copolymer powder and from 0% to about 40% of a crosslinked copolymer powder. In another embodiment, the blend comprises a copolymer mixture comprising from about 60% to about 95% by weight of the linear copolymer and from about 5 to about 40% by weight of the crosslinked copolymer. In yet another embodiment, the copolymer mixture comprises from 60% to about 85% by weight of the linear copolymer and from about 15 to about 40% by weight of the crosslinked copolymer.

The copolymers used to prepare the blend may be in powder form. The acrylonitrile-butadiene copolymer powders may contain other materials such as partitioning agents. Examples of useful partitioning agents include polyvinyl chloride and inorganic materials such as powdered calcium carbonate. The amount of partitioning agent present in the acrylonitrile-butadiene copolymers may vary over a wide range. In some embodiments the amount of partitioning agent is within the range of from about 0% to about 25%, about 5% to about 15%, about 5% to about 10%, about 10% to about 15%, or about 10% to about 20% by weight.

In some embodiments, a waterproofing composition may contain from about 3% to about 15% by weight of the acrylonitrile copolymer powder based on the total weight of the waterproofing composition. In another embodiment, a waterproofing composition may contain from 5% to about 15% by weight of the copolymer powder or even from about 7% to about 15% by weight of the copolymer powder. In some embodiments a waterproofing composition comprises about 1% to about 20%, about 3% to about 18%, about 5% to about 15%, about 8% to about 12%, about 10% to about 20%, or about 1% to about 10% by weight acrylonitrile butadiene copolymer. In some embodiments a waterproofing composition comprises about 1%, about 3%, about 5%, about 7%, about 8%, about 9%, about 10%, about 11%, about 12%, about 13%, about 14%, about 15%, about 18%, about 20%, or about 25% by weight acrylonitrile butadiene copolymer.

In some embodiments, a waterproofing composition may contain from about 15% to about 40% by weight of the copolymer based on the weight of the coal tar present in the emulsion. In some embodiments, a waterproofing composition may contain from about 20% to about 35%, about 25% to about 30%, about 25% to about 40%, or about 15% to about 45% by weight of copolymer based on the weight of the coal tar in the waterproofing composition. In some embodiments, a waterproofing composition may contain about 15%, about 20%, about 25%, about 30%, about 35%, about 40%, or about 45% by weight of copolymer based on the weight of the coal tar in the waterproofing composition.

Solvent

In some embodiments a waterproofing composition comprises about 5% to about 70%, about 10% to about 60%, about 15% to about 50%, about 20% to about 50%, about 25% to about 40%, about 5% to about 30%, about 10% to about 25%, about 14% to about 26%, or about 30% to about 60% by weight solvent based on the weight of the waterproofing composition. In some embodiments a waterproofing composition comprises about 10%, about 15%, about 20%, about 25%, about 30%, about 35%, about 40%, about 45%, about 50%, about 55%, or about 60% by weight solvent based on the weight of the waterproofing composition.

Suitable solvents for use with embodiments of the invention may include, but are not limited to mineral spirits, an aromatic hydrocarbon solvent (e.g., solvent 100), xylene, toluene, or combinations of two or more thereof. In some embodiments, a suitable solvent is mineral spirits, an aromatic hydrocarbon solvent (e.g., solvent 100), xylene, toluene, or combinations of two or more thereof. Solvents such as mineral spirits, an aromatic hydrocarbon solvent, xylene, toluene, or combinations of two or more thereof may be particularly useful in embodiments of the invention for use in cold temperatures.

Clay

In some embodiments, a waterproofing composition of the present invention may also contain clay such as a ball clay. Ball clays usually comprise from about 20% to about 80% kaolinite, from about 10% to about 25% mica, and from about 6% to about 65% quartz. In addition, other minerals and some carbonaceous material (derived from ancient plants) may be present in a ball clay. A ball clay may coat the bitumen particles and thereby support or stabilize the emulsion. In some embodiments addition of a ball clay may add properties such as flow control, sag resistance, stiffness, etc. to the waterproofing composition after it goes through the curing process of cooling, water evaporation or solvent loss and drying. A variety of clays can be utilized in the emulsions of the present invention in addition to a ball clay. Additional clays may be acidic or neutral. Examples of useful additional clays include china clays, fire clays and kaolin clays. In other embodiments an additional clay may be an attapulgite clay, a bentonite clay, or a sepiolite clay.

In some embodiments a waterproofing composition comprises about 0% to about 40%, about 0% to about 30%, about 0% to about 20%, about 1% to about 20%, about 2% to about 20%, about 5% to about 20%, about 10% to about 20%, about 2% to about 15%, about 2% to about 10%, about 2% to about 5%, about 5% to about 10%, or about 5% to about 15% by weight clay based upon the total weight of the waterproofing composition. In some embodiments, a waterproofing composition comprises about 0%, about 1%, about 2%, about 3%, about 4%, about 5%, about 6%, about 7%, about 8%, about 9%, about 10%, about 12%, about 15%, about 20%, or about 25% by weight clay.

Water

In some embodiments, a waterproofing composition of the present invention may contain water as a carrying agent. In some embodiments, a waterproofing composition according to the present invention may contain water and a ball clay. In some embodiments containing water, the waterproofing composition may be an emulsion. Without being bound by theory, ball clay may coat other particles of a waterproofing composition, allowing the particles to be emulsified in water.

In some embodiments a waterproofing composition comprises about 5% to about 70%, about 10% to about 60%, about 15% to about 50%, about 20% to about 50%, about 25% to about 40%, about 5% to about 30%, about 10% to about 25%, about 14% to about 26%, or about 30% to about 60% by weight water based on the weight of the waterproofing composition. In some embodiments a waterproofing composition comprises about 10%, about 15%, about 20%, about 25%, about 30%, about 35%, about 40%, about 45%, about 50%, about 55%, or about 60% by weight water based on the weight of the waterproofing composition.

Other Ingredients

In some embodiments other ingredients may be included in waterproofing compositions of the invention. For example, in some embodiments a waterproofing composition includes rubber latex. In some embodiments a waterproofing composition comprises about 0% to about 35%, about 5% to about 30%, about 10% to about 30%, about 20% to about 26%, about 0% to about 5%, about 5% to about 10%, about 10% to about 15%, about 15% to about 20%, about 25% to about 30%, or about 30% to about 35% by weight other ingredients based on the total weight of the waterproofing composition. In some embodiments, a waterproofing composition comprises up to about 5%, up to about 10%, up to about 15%, up to about 20%, up to about 25%, up to about 30%, or up to about 35% by weight other ingredients based on the total weight of the waterproofing composition.

Method of Preparation

In an embodiment a waterproofing composition may be formed by blending a coal tar, RAS, solvent, and acrylonitrile-butadiene copolymer powder. In some embodiments the solvent may be mineral spirits, an aromatic hydrocarbon solvent (e.g. solvent 100), xylene, toluene, or a combination of two or more thereof.

In an embodiment a waterproofing composition may be formed by blending a coal tar, RAS, water, acrylonitrile-butadiene copolymer powder, and clay. In some embodiments the clay may be ball clay In an embodiment a waterproofing composition may be formed by blending, based on the total weight of the emulsion, from about 15% to about 50% by weight of coal tar; from about 10% to about 30% of RAS; from about 25% to about 50% by weight of water; from about 3% to about 15% by weight of a acrylonitrile-butadiene copolymer powder; and from about 10% to about 20% by weight of clay.

In some embodiments a method of forming a waterproofing composition comprises mixing a coal tar, at least one acrylonitrile-butadiene copolymer powder, and RAS to form a mixture and heating the mixture to a temperature of at least about 120° C., at least about 130° C., at least about 140° C., at least about 150° C., at least about 160° C., at least about 170° C., at least about 180° C., or at least about 190° C.

In some embodiments, a method of forming a waterproofing composition comprises mixing water and clay to form a mixture and heating the mixture to a temperature of at least about 25° C., 30° C., 35° C., 40° C., 45° C., 50° C., 55° C., 60° C. or 65° C.

In some embodiments, a method of forming a waterproofing composition comprises combining a mixture comprising coal tar, at least one acrylonitrile butadiene copolymer and RAS and a mixture comprising water and clay. In some embodiments a method of forming a waterproofing composition further comprises agitating the composition to form an emulsion.

In some embodiments, a method of forming a waterproofing composition comprises combining a mixture comprising coal tar, at least one acrylonitrile butadiene copolymer and RAS and a solvent. In some embodiments the solvent may be mineral spirits, an aromatic hydrocarbon solvent (e.g. solvent 100), xylene, toluene, or a combination of two or more thereof.

In another embodiment, a method of forming a waterproofing composition comprises mixing a coal tar, at least one acrylonitrile-butadiene copolymer powder, and RAS to form a first mixture, heating the first mixture to a temperature of at least about 160° C., mixing water and clay to form a second mixture; heating the second mixture to a temperature of at least about 45° C.; combining the first and second mixtures to form a waterproofing composition and agitating the waterproofing composition to form an emulsion. In some embodiments a method further comprises adding a rubber latex to the emulsion. In some embodiments, waterproofing emulsions may be used in the same way and may comprise the same combinations of ingredients in the same percentages as described herein for waterproofing compositions.

Method of Use

Embodiments of the waterproofing compositions of the present invention are useful particularly for reducing water penetration through a surface, such as roofing or pavement. Exemplary waterproofing compositions of the invention, when applied to a surface, may act as waterproofing and/or pavement sealcoating materials. More particularly, embodiments of waterproofing compositions are useful in built-up roofing (BUR) applications. The coating formed from the waterproofing compositions of the invention may exhibit improved tensile, elongation and recovery characteristics, improved fatigue resistance improved adhesive qualities, and improved cold temperature performance.

In some embodiments, a method of waterproofing a surface comprises applying a waterproofing composition to the surface, wherein the waterproofing composition comprises coal tar, an acrylonitrile butadiene copolymer, and ground roofing shingles. In some embodiments a waterproofing composition further comprises a solvent. In some embodiments a waterproofing composition further comprises a clay. In some embodiments a waterproofing composition further comprises water and a clay (e.g. ball clay). In some embodiments the method of waterproofing a surface comprises applying a waterproofing composition to cover at least 70%, 75%, 80%, 85%, 90%, 95%, or 100% of the area of the surface to be waterproofed.

In some embodiments a method of waterproofing a surface comprises applying a waterproofing composition to a thickness of about 1 to about 10 gallons of waterproofing composition per area of about 100 square feet of surface. In some embodiments, a method of waterproofing a surface comprises applying a waterproofing composition at a thickness of about 2 to about 8, about 3 to about 7, or about 4 to about 6 gallons of waterproofing composition per area of about 100 square feet of surface. In some embodiments, a method of waterproofing a surface comprises applying a waterproofing composition at a thickness of about 1, about 2, about 3, about 4, about 5, about 6, about 7, about 8, about 9, or about 10 gallons of waterproofing composition per area of about 100 square feet of surface.

EXAMPLES

Example 1

A particular embodiment of this invention is given in the following batch preparation outline:

Prepare at an elevated temperature, e.g., at about 150° C. to about 190° C., a mixture comprising from about 80 parts to about 98 parts by weight of coal tar having an overall float test of from about 50 seconds to about 220 seconds, and from about 2 parts to about 20 parts by weight of coal tar pitch having a softening point of from about 140° C., to about 160° C.

Maintain the mixture at a temperature of at least about 170° C. Add RAS (ground roofing asphalt shingles) to the mixture, from about 1% to about 20% by weight, based on the total weight of the composition, and mix the RAS into the mixture.

Maintain the mixture at a temperature of at least about 170° C. Add acrylonitrile butadiene copolymer to the mixture, from about 1% to about 20% by weight, based on the total weight of the composition, and mix the acrylonitrile butadiene copolymer into the mixture.

Example 2

Blend RT12 Coal Tar (242 grams); Roofing Coal Tar (13.75 grams); P615 Rubber (19.25 grams) Mix 45 min at 350° F. The Softening Point is 135.5° F.

Example 3

Blend RT12 Coal Tar (228.25 grams); Roofing Coal Tar (13.75 grams), P615 Rubber (19.25 grams). Mix 45 min at 350° F. Blend RAS (13.75 grams) into composition and mix 15 min at 350° F. The Softening Point is 136° F.

Example 4

Blend RT12 Coal Tar (214.5 grams), Roofing Coal Tar (13.75 grams), P615 Rubber (19.25 grams). Mix 45 min at 350° F. Blend RAS (27 grams) into composition and mix 15 min at 350° F. The Softening Point is 142.5° F.

Example 5

Blend RT12 Coal Tar (200.75 grams), Roofing Coal Tar (13.75 grams), P615 Rubber (19.25 grams). Mix 45 min at 350° F. Blend RAS (40.75 grams) into the composition. Mix 15 min at 350° F. The Softening Point is 153° F.

Example 6

Blend RT12 Coal Tar (187 grams), Roofing Coal Tar (13.75 grams), P615 Rubber (19.25 grams). Mix 45 min at 350° F. Blend RAS (54 grams) into the composition. Mix 15 min at 350° F. The Softening Point is 160° F.

We claim:

1. A waterproofing composition comprising coal tar, an acrylonitrile butadiene copolymer, and ground roofing shingles.

2. The waterproofing composition according to claim 1, further comprising a clay.

3. The waterproofing composition according to claim 1, further comprising a solvent.

4. The waterproofing composition according to claim 1, further comprising water.

5. The waterproofing composition according claim 1, wherein the coal tar is a ASTM D450 Type I or Type III coal tar and wherein the coal tar has a softening point of about 52° C. to about 64° C.

6. The waterproofing composition according to claim 1, wherein the coal tar has a float test of from about 50 seconds to about 220 seconds as determined by ASTM Test D139.

7. The waterproofing composition according to claim 1, wherein the coal tar is an RT-7, RT-8, RT-9, RT-10, RT-11, or RT-12 coal tar.

8. The waterproofing composition according to claim 1, wherein the coal tar is an RT-12 coal tar.

9. The waterproofing composition according to claim 1, wherein the acrylonitrile butadiene copolymer comprises 1,3-butadiene.

10. The waterproofing composition according to claim 1, wherein the composition comprises about 3% to about 15% by weight acrylonitrile butadiene copolymer in the composition.

11. The waterproofing composition according to claim 1, wherein the acrylonitrile butadiene copolymer comprises about 20% to about 45% by weight acrylonitrile.

12. The waterproofing composition according to claim 1, wherein the acrylonitrile butadiene copolymer comprises a partitioning agent.

13. A method of preparing a waterproofing composition comprising:
   mixing a coal tar, an acrylonitrile-butadiene copolymer, and ground roofing shingles to form a mixture; and
   heating the mixture to a temperature of at least about 160° C. to form a waterproofing composition.

14. The method according to claim 13, wherein the waterproofing composition comprises from about 15% to about 50% by weight of coal tar, from about 10% to about 30% by weight of ground roofing shingles, from about 25% to about 50% by weight of water, from about 3% to about 15% by weight of an acrylonitrile-butadiene copolymer, and from about 10% to about 20% by weight of clay.

15. The method according to claim 14, wherein the coal tar has an overall float test time of from about 50 seconds to about 220 seconds.

16. The method according claims 14, further comprising blending a first coal tar and a second coal tar to form a coal tar.

17. A method of reducing water penetration through a surface comprising applying a waterproofing composition to the surface, wherein the waterproofing composition comprises coal tar, an acrylonitrile butadiene copolymer, and ground roofing shingles.

18. The method according to claim 17, wherein the waterproofing composition further comprises a solvent.

19. The method according to claim 17, wherein the waterproofing composition further comprising a clay.

20. The method according to claim 17, wherein the waterproofing composition further comprises water.

* * * * *